United States Patent
Symonds et al.

(10) Patent No.: US 11,636,532 B2
(45) Date of Patent: Apr. 25, 2023

(54) TEXT-BASED SECURE ORDER PROCESSING

(71) Applicant: Triton Technologies, Inc., Mansfield, MA (US)

(72) Inventors: Cameron Symonds, Mansfield, MA (US); Debbie Cohen Skelton, Mansfield, MA (US)

(73) Assignee: Valor Global, LLC, Phoenix, AZ (US)

( * ) Notice: Subject to any disclaimer, the term of this patent is extended or adjusted under 35 U.S.C. 154(b) by 277 days.

(21) Appl. No.: 17/152,482

(22) Filed: Jan. 19, 2021

(65) Prior Publication Data
US 2021/0166296 A1    Jun. 3, 2021

Related U.S. Application Data

(63) Continuation of application No. 16/247,337, filed on Jan. 14, 2019, now Pat. No. 10,922,741.

(51) Int. Cl.
| | |
|---|---|
| *G06Q 30/06* | (2012.01) |
| *H04L 29/08* | (2006.01) |
| *G06Q 30/0601* | (2023.01) |
| *H04L 67/02* | (2022.01) |
| *H04W 4/12* | (2009.01) |

(52) U.S. Cl.
CPC ..... *G06Q 30/0635* (2013.01); *G06Q 30/0641* (2013.01); *H04L 67/02* (2013.01); *H04W 4/12* (2013.01)

(58) Field of Classification Search
CPC .......... G06Q 30/06–0645; G06Q 30/08; H04L 67/02; H04W 4/12
See application file for complete search history.

(56) References Cited

U.S. PATENT DOCUMENTS

| | | | |
|---|---|---|---|
| 8,352,376 B2 * | 1/2013 | Yuen | G06Q 20/40 902/4 |
| 9,223,537 B2 | 12/2015 | Brown et al. | |
| 9,756,487 B1 | 9/2017 | Ghadialy | |
| 10,498,674 B2 | 12/2019 | Sagar | |
| 10,594,635 B2 | 3/2020 | Kuncheria et al. | |
| 2002/0072991 A1 | 6/2002 | Kane | |
| 2007/0203836 A1 | 8/2007 | In | |

(Continued)

FOREIGN PATENT DOCUMENTS

EP        2587420 A1 *   5/2013    ............. G06Q 20/12

OTHER PUBLICATIONS

Non-Final Office Action dated Jun. 1, 2020 in U.S. Appl. No. 16/247,337.

(Continued)

*Primary Examiner* — Adam L Levine
(74) *Attorney, Agent, or Firm* — Snell & Wilmer L.L.P.

(57) ABSTRACT

Systems and methods for text-based secure order processing are disclosed. The system may receive an order initiation request from a user device. Based on the order initiation request, the system may retrieve a conversational order script having one or more scripted conversation prompts. The system may transmit the conversation prompts to the user device and receive one or more conversation responses from the user device. Based on the conversation responses, the system may transmit a purchase link to the user device. The purchase link may allow the user device to access a web interface to complete the purchase order.

20 Claims, 4 Drawing Sheets

(56) References Cited

U.S. PATENT DOCUMENTS

| | | | |
|---|---|---|---|
| 2011/0060609 A1* | 3/2011 | Meers | G06Q 30/02 |
| | | | 705/400 |
| 2012/0215871 A1 | 8/2012 | Zhang | |
| 2012/0310752 A1 | 12/2012 | Gaddis | |
| 2012/0310753 A1* | 12/2012 | Gaddis | G06Q 30/0267 |
| | | | 705/14.73 |
| 2013/0179264 A1 | 7/2013 | Wilson | |
| 2013/0268372 A1 | 10/2013 | Jalili | |
| 2014/0310001 A1* | 10/2014 | Kalns | G10L 15/30 |
| | | | 704/270.1 |
| 2015/0262271 A1 | 9/2015 | Krishnamurthy | |
| 2017/0132207 A1 | 5/2017 | Goldstein et al. | |
| 2018/0174116 A1* | 6/2018 | Maenpaa | G06Q 20/102 |

OTHER PUBLICATIONS

Final Office Action dated Dec. 10, 2020 in U.S. Appl. No. 16/247,337.
Notice of Allowance dated Jan. 7, 2021 in U.S. Appl. No. 16/247,337.
McKeough, "The Lure of an Actual Store: [Specialsections]." New York Times, Late Edition (East Coast); New York, N.Y. [NewYork, N,Y]Nov. 11, 2016: F.12. https://www.proquest.com/newspapers/lure-actual-store/docview/1837864600/se-2?accountid= 147 53 (2016).

* cited by examiner

TEXT-BASED SECURE ORDER PROCESSING

CROSS REFERENCE TO RELATED APPLICATIONS

This application is a continuation of, claims priority to and the benefit of, U.S. patent application Ser. No. 16/247,337 filed Jan. 14, 2019 and entitled "TEXT-BASED SECURE ORDER PROCESSING." The above-identified application is hereby incorporated by reference in its entirety for all purposes.

FIELD

This disclosure generally relates to mobile ordering and transactions, and more particularly, to systems and methods for text-based secure transactions and order processing.

BACKGROUND

Users may initiate transactions with a merchant using various methods. For example, a user may initiate a transaction with a merchant in person (e.g., via a brick and mortar store), by telephone, or online (e.g., via a mobile application or merchant website). Merchants may advertise to users through a direct marketing service. For example, the direct marketing service may advertise a good or service and may provide a phone number to call to purchase the good or service. The user may call using the provided phone number and speak with a customer service representative to purchase the good or service.

A technical problem is that payment information, and confidential user information, must be audibly delivered from the user to the customer service representative to complete the purchase, thus decreasing the security of the data being relayed. As such, the audible transmission may be intercepted and/or misused by a third party. The customer service representative may also mishear the payment information or mistype the payment information to complete the order, causing the transaction to be delayed or declined. Moreover, the typical process requires manual input by the customer service representative, thus increasing CPU, memory, and data storage usage and needs.

SUMMARY

Systems, methods, and computer readable mediums (collectively, the "system") are disclosed for text-based secure order processing. The system may receive an order initiation request from the user device, wherein the order initiation request is transmitted via a unique direct order identifier. The system may retrieve a conversational order script based on the unique direct order identifier. The system may transmit a first conversation prompt from the conversational order script to the user device. The system may receive a first conversation response from the user device, wherein the first conversation response is based on the first conversation prompt. The system may transmit a purchase link to the user device, wherein the purchase link comprises a web URL associated with an online platform for completing a purchase order.

In various embodiments, the system may determine a second conversation prompt based on the first conversation response and the conversational order script. The system may transmit the second conversation prompt to the user device. The system may receive a second conversation response from the user device, wherein the second conversation response is based on the second conversation prompt.

In various embodiments, the system may receive a user input in response to the user device accessing the purchase link, wherein the user input comprises at least one of a purchase confirmation, shipping information, or billing information. The system may generate the purchase order based on the user input. The system may transmit the purchase order to a payment processor, wherein in response to receiving the purchase order the payment processor is configured to processes a payment associated with the purchase order. The system may transmit the purchase order to a merchant system.

In various embodiments, the system may capture user conversation data based on the conversation response. The system may store the user conversation data in a recorded conversation database. In various embodiments, the unique direct order identifier comprises a phone number, an email address, or a chat name. The first conversation prompt and the first conversation response may be transmitted via simple messaging service (SMS), multimedia messaging service (MMS), email, API, or webchat.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
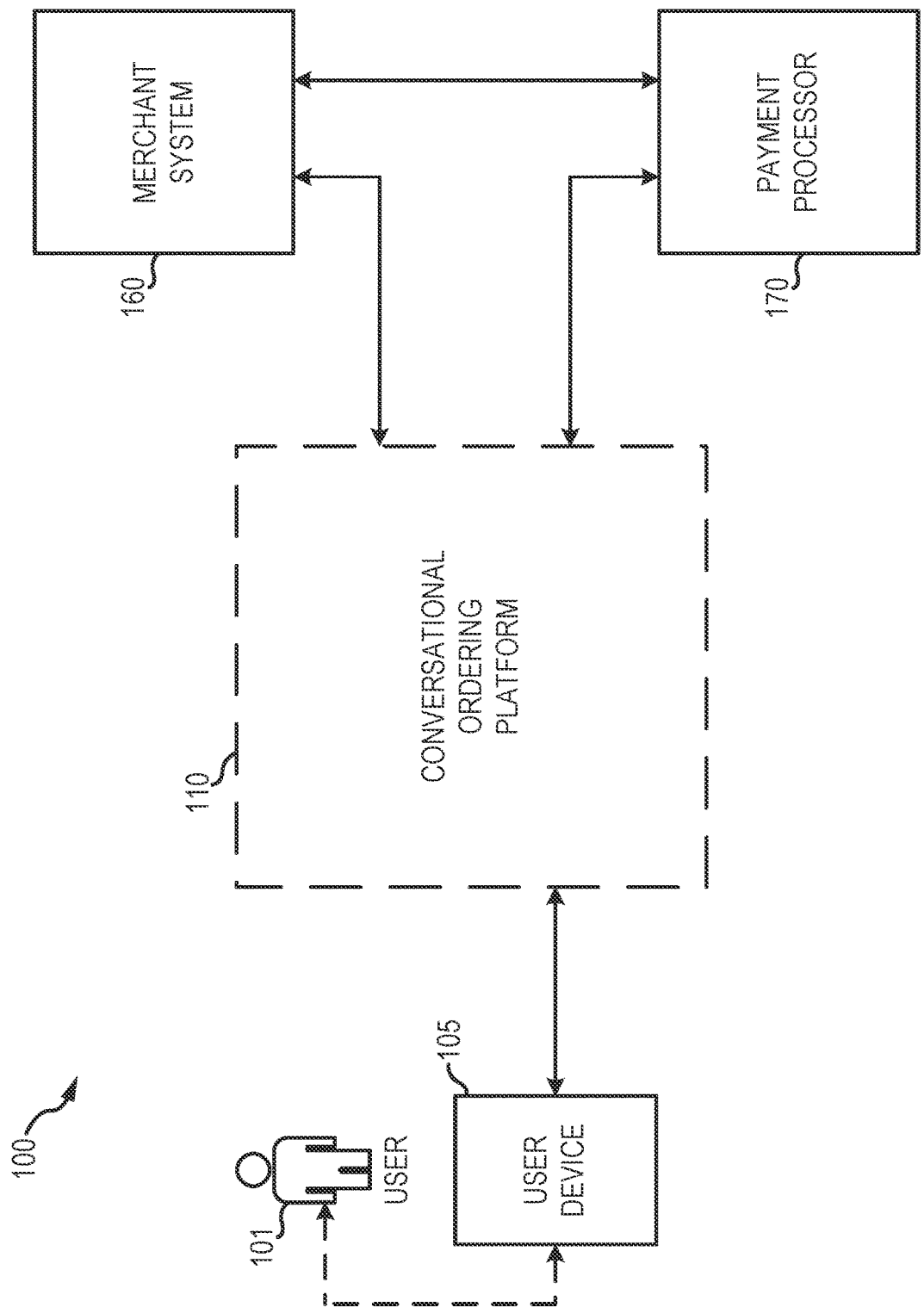
FIG. 1 is a block diagram illustrating a system for text-based secure order processing, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems, methods, and computer readable mediums (collectively, the "system") described herein provides text-based secure ordering and transaction processing, in accordance with various embodiments. The system may provide a conversational text-based platform that allows consumers to seamlessly transition from initiating an order for a merchant-provided good or service using a text-based conversation (e.g., via SMS, MMS, email, webchat, API, etc.), to finalizing the transaction using a mobile payment collection interface. The system may allow merchants to advertise directly to consumers and provide a text-based conversational platform for users to initiate and complete purchases. In that regard, the system may enable users to complete purchases with one or more merchants, via a direct ordering platform, without needing to download a mobile application, access an external website to initiate an order, or call a customer service representative to initiate and/or complete an order. The system may also track and record the text-based conversations to ensure reporting compliance, for merchant review, and the like.

The system further improves the functioning of the computer. In that respect, the system may provide a technical solution to the technical problems found in typical ordering processes using direct advertising. For example, by transmitting, storing, and accessing data using the processes described herein, the security, integrity, and accuracy of the data is improved, which decreases the risk of sensitive data (e.g., transaction account data, user data, etc.) being compromised or incorrectly entered or stored. Moreover, by using text-based conversations to initiate purchases, and not requiring the use of mobile application, merchant website, or the like, the system may decrease resource usage in the user's mobile phone, improve mobile phone battery life, and allow the user to conveniently return to a pending purchase at any time once initiated. For example, compared to mobile websites or applications (e.g., several megabytes in size) text-based conversations may require less data transmission (e.g., 140 bytes in size).

In various embodiments, the system may also provide a more consistent customer experience compared to typical mobile purchasing applications and websites. For example, content may render on mobile device differently depending on the mobile device, operating system, web browser, and the like. For example, a webpage may load as intended by the developer on an APPLE® IPHONE® but may load completely different on an ANDROID® phone. In contrast, user experiences with text-based messaging is reasonably consistent on most mobile phones.

In various embodiments, and with reference to FIG. 1, a system 100 for text-based secure order and transaction processing is disclosed. System 100 may comprise one or more of a user device 105, a conversational ordering platform 110, a merchant system 160, and/or a payment processor 170. As discussed further herein, system 100 may also provide customer relationship management (CRM) functionalities, order management, payment processor integration, and/or the availability of third-party web services, APIs, and the like.

In various embodiments, user 101 may desire to purchase goods and/or services from merchant system 160. For example, a merchant (e.g., a merchant associated with merchant system 160) may directly, or via a third-party service or the like, advertise various goods or services to user 101. The merchant may advertise to user 101 to purchase goods or services as a direct order through conversational ordering platform 110. For example, and as discussed further herein, user 101 may be directed to contact conversational ordering platform 110 (e.g., via email, SMS, MMS, webchat, API, etc.) to initiate a transaction with merchant system 160. In that regard, user 101 may be provided a phone number, email address, chat name, or the like to contact to initiate the transaction. User 101, via user device 105 may engage conversational ordering platform 110 by transmitting an order initiation request via the provided phone number, email address, chat name, or the like.

In various embodiments, user 101 may initiate and complete transactions using user device 105. User device 105 may be in electronic communication with conversational ordering platform 110. User device 105 may comprise any suitable hardware, software, and/or database components capable of sending, receiving, and storing data. For example, user device 105 may comprise a personal computer, personal digital assistant, cellular phone, smartphone (e.g., IPHONE®, BLACKBERRY®, etc.), internet of things (IoT) device, and/or the like. User device 105 may comprise an operating system such as, for example, a WINDOWS® mobile operating system, an ANDROID® operating system, APPLE® IOS®, a BLACKBERRY® operating system, a LINUX® operating system, and the like. User device 105 may also comprise software components installed on user device 105 and configured to allow user 101, via user device 105, access to various systems, services, and components in system 100. For example, user device 105 may comprise a web browser (e.g., MICROSOFT INTERNET EXPLORER®, GOOGLE CHROME®, etc.), an application, a micro-app or mobile application, or the like.

In various embodiments, conversational ordering platform 110 may be configured to enable text-based ordering and transactions with user 101, via user device 105. Conversational ordering platform 110 may comprise a central platform in system 100 configured to allow merchants (via merchant system 160) to register for text-based secure order processing and users 101 to complete text-based secure orders. For example, in response to user 101 initiating communications with conversational ordering platform 110, conversational ordering platform 110 may be configured to transmit one or more text-based scripted responses to user 101 to initiate a purchase order, as discussed further herein. Conversational ordering platform 110 may also be configured to record the text-based conversations between user 101 and conversational ordering platform 110, as discussed further herein.

Conversational ordering platform 110 may be in electronic communication with user device 105, merchant system 160, and/or payment processor 170. Conversational ordering platform 110 may comprise various software, hardware, and/or database components. For example, conversational ordering platform 110 may comprise one or more network environments, servers, web servers, computer-based systems, processors, databases, and/or the like. Conversational ordering platform 110 may comprise at least one computing device in the form of a computer or processor, or a set of computers/processors, although other types of computing units or systems may be used such as, for example, a server, web server, pooled servers, or the like. Conversational ordering platform 110 may also include one or more data centers, cloud storages, or the like, and may include software, such as APIs, web services, or the like configured to perform various operations discussed herein. In various embodiments, conversational ordering platform 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. The processor may comprise one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

Figure 2:
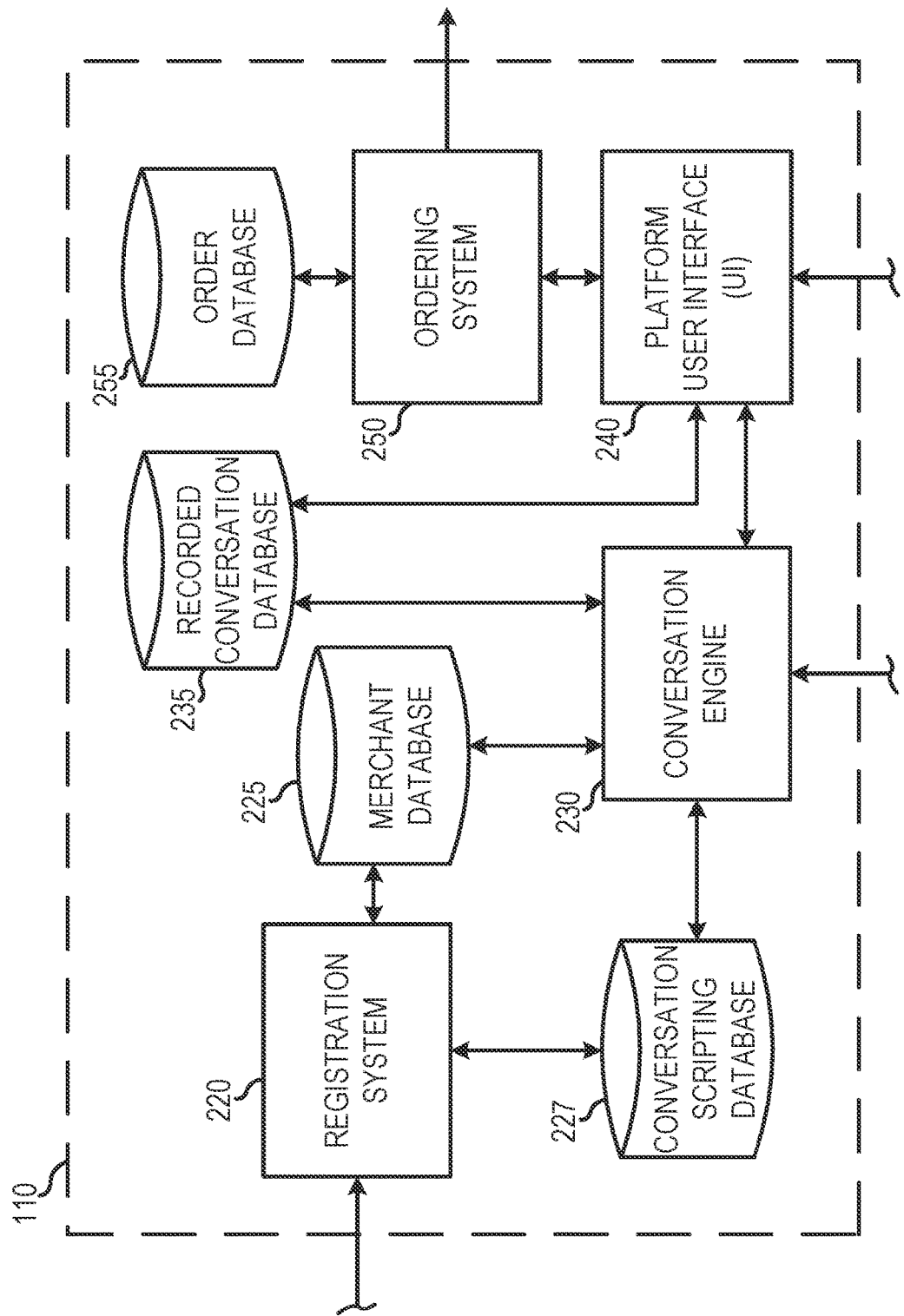
FIG. 2 is a block diagram illustrating an exemplary conversational ordering platform for use in the system for text-based secure order processing, in accordance with various embodiments.

In various embodiments, conversational ordering platform 110 may comprise various systems, engines, interfaces, and the like configured to provide ordering and transaction capabilities, as discussed further herein. For example, and with reference to FIG. 2, conversational ordering platform 110 may comprise a registration system 220, a conversation engine 230, a platform user interface (UI) 240, and/or an ordering system 250. Each system, engine, UI, or the like may be implemented by various means depending upon applications according to particular examples. For example, such methodologies may be implemented in hardware, firmware, software, or combinations thereof. In a hardware implementation, for example, a controller or processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof. In a software implementation, for example, various web services, APIs, SDKs, or the like may be configured to perform the various operations described herein.

In various embodiments, conversational ordering platform 110 may also comprise one or more databases. For example, conversational ordering platform 110 may comprise a merchant database 225, a conversation scripting database 227, a recorded conversation database 235, and/or an order database 255. The databases may each comprise virtual or logical partitions of one or more databases. The databases may also each comprises physically separate databases. Each database may comprise any suitable type of database, and may store and maintain data using any suitable technique. For example, any database discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Washington), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

In various embodiments, registration system 220 may be in electronic communication with merchant database 225 and/or conversation scripting database 227. Registration system 220 may be configured to register one or more merchant systems 160 for text-based secure order processing. For example, and as discussed further herein, registration system 220 may be configured to receive merchant registration requests, update merchant database 225 to store merchant data corresponding to the merchant registration requests, generate conversational order scripts to control the text-based conversations, and store the conversational order scripts in conversation scripting database 227, as discussed further herein.

In various embodiments, merchant database 225 may be configured to store and maintain data corresponding to merchant system 160. For example, merchant database may store and maintain merchant data, order data (e.g., product and/or service data), payment option data, and the like. The merchant data may comprise merchant identifying data (e.g., merchant name, merchant ID, etc.), merchant contact information (e.g., merchant address, merchant phone number, etc.), merchant preferences (e.g., receive completed orders as a batch process or individually, etc.), and/or the like. The order data may comprise information regarding the products and/or services being made available for text-based secure transactions. For example, the order data may comprise product or service identifying data (e.g., product or service name, product or service ID, etc.), product or service price, product or service promotions (e.g., buy one get one free, free shipping, etc.), and/or the like. The payment option data may comprise information regarding available payment options for the products and/or services made available by merchant system 160.

In various embodiments, conversation scripting database 227 may be configured to store and maintain conversational order scripts for use in conversational ordering platform 110. The conversational order scripts may relate to one or more products or services made available by merchant system 160 and may comprise one or more conversation prompts. For example, a first conversation prompt may comprise a prompt introduction (e.g., "Are you interested in ordering the product name?", "Are you interested in purchasing from merchant name?", etc.), a prompt response type (e.g., "text Y/N"), a prompt opt-out (e.g., "text STOP to end," "text HELP for help," "standard message and data rates may apply," etc.), and/or the like. As a further example, a second conversation prompt may comprise one or more prompts to follow up on a user's response to the first conversation prompt (e.g., "Great! Product name is in stock," "The product name is $299," "The product name is eligible for a buy one, get one free promotion," "Are you ready to order?", etc.) and a prompt response type (e.g., "Y/N"). In various embodiments, the second conversation prompt may also comprise a product or service selection prompt (e.g., "Merchant name has the following products available: X, Y, and Z," "text X to order product X, Y to order product Y, or Z to order product Z," etc.). As a further example, a final conversation prompt in the conversational order script may comprise a purchase link. The purchase link may comprise a web URL or the like configured to direct user 101 to platform UI 240 to complete a purchase.

In various embodiments, conversation engine 230 may be configured to engage with user 101, via user device 105, to initiate and complete text-based secure orders. For example, conversation engine 230 may receive order initiation request from user device 105, retrieve a conversational order script based on the request, and interact with user 101, via user device 105, by transmitting one or more conversation prompts and receiving one or more conversation responses, as discussed further herein.

In various embodiments, conversation engine 230 may be configured to capture user conversation data and store the user conversation data in recorded conversation database 235. Recorded conversation database 235 may store and maintain the user conversation data using any suitable technique. The user conversation data may comprise a record of the text-based conversation between user 101 and conversation engine 230. In various embodiments, the user conversation data may also comprise data input and/or selected by user 101 during the order confirmation process in platform UI 240. Conversation engine 230 may capture the user conversation data in response to receiving any communication from user 101 (e.g., a prompt response, an input into platform UI 240, etc.), in response to user 101 completing the purchase order, and/or the like.

In various embodiments, platform UI 240 may be configured to provide a web-based interface for user 101 to access and complete pending purchase orders. For example, user 101, via user device 105, may access platform UI 240 in response to receiving the purchase link from conversation engine 230. Platform UI 240 may be configured to enable user 101 to review and confirm pending purchase information and select and/or input payment information, shipping options, a shipping address, and/or the like.

Platform UI 240 may transmit the user 101 inputs to ordering system 250. Ordering system 250 may be configured to generate purchase orders, store the purchase orders in order database 255, transmit the purchase orders to payment processor 170 and/or merchant system 160, and/or confirm the order with user 101, via user device 105. Order database 255 may be configured to store and maintain the purchase orders using any suitable technique.

In various embodiments, and with reference again to FIG. 1, merchant system 160 may be configured to register with conversational ordering platform 110 for text-based secure order processing, receive completed purchase orders from conversational ordering platform 110, and complete purchases orders with user 101, as discussed further herein. Merchant system 160 may be in electronic communication with conversational ordering platform 110 and/or payment processor 170. Merchant system 160 may incorporate one or more hardware, software, and/or database components. For example, merchant system 160 may comprise one or more network environments, servers, computer-based systems, processors, databases, datacenters, and/or the like. In various embodiments, merchant system 160 may be computer based, and may comprise a processor, a tangible non-transitory computer-readable memory, and/or a network interface, along with other suitable system software and hardware components. Instructions stored on the tangible non-transitory memory may allow merchant system 160 to perform various operations, as described herein.

In various embodiments, payment processor 170 may be configured to configured to receive purchase orders or instructions from conversational ordering platform 110, complete payments with user 101, and transmit payment notifications to merchant system 160 in response to successfully completing a payment. Payment processor 170 may be in electronic communication with conversational ordering platform 110 and/or merchant system 160. Payment processor 170 may comprise any suitable combination of hardware, software, and/or database components. For example, payment processor 170 may comprise one or more network environments, servers, computer-based systems, processors, databases, and/or the like. Payment processor 170 may comprise at least one computing device in the form of a computer or processor, or a set of computers/processors, although other types of computing units or systems may be used such as, for example, a server, web server, pooled servers, or the like. Payment processor 170 may also include one or more data centers, cloud storages, or the like, and may include software, such as APIs, configured to perform various operations discussed herein. In various embodiments, payment processor 170 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment processor 170 may include a company (e.g., a third-party such as PAYPAL®, SQUARE®, etc.) appointed (e.g., by merchant system 160) to handle transactions from conversational ordering platform 110. Payment processor 170 may include an issuer, acquirer, authorizer, and/or any other system or entity involved in the transaction process. For example, payment processor 170 may comprise a front-end or back-end payment processor. Front-end payment processors have connections to various transaction accounts and supply authorization and settlement services to merchant system 160. Back-end payment processors accept settlements from front-end payment processors and, via The Federal Reserve Bank, move money from an issuing bank to the merchant bank associated with merchant system 160. In an operation that will usually take a few seconds, payment processor 170 will check the details received in the transaction by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to payment processor 170 receiving confirmation that the transaction account details have been verified, the information may be relayed back to merchant system 160, who will then complete the payment transaction. In response to the verification being denied, payment processor 170 relays the information to merchant system 160, who may then decline the transaction.

In various embodiments, payment processor 170 may comprise or interact with a traditional payment network or transaction network to facilitate payments, authorize transactions, settle transactions, and the like. For example, payment processor 170 may represent existing proprietary networks that presently accommodate transactions for credit cards, debit cards, and/or other types of transaction accounts or transaction instruments. Payment processor 170 may be a closed network that is secure from eavesdroppers. In various embodiments, payment processor 170 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, issuer network or the like. Payment processor 170 may include systems and databases related to financial and/or transactional systems and processes such as, for example, one or more authorization engines, authentication engines and databases, settlement engines and databases, accounts receivable systems and databases, accounts payable systems and databases, and/or the like. In various embodiments, payment processor 170 may also comprise a transaction account issuer's Credit Authorization System ("CAS") capable of authorizing transactions, as discussed further herein.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 3:
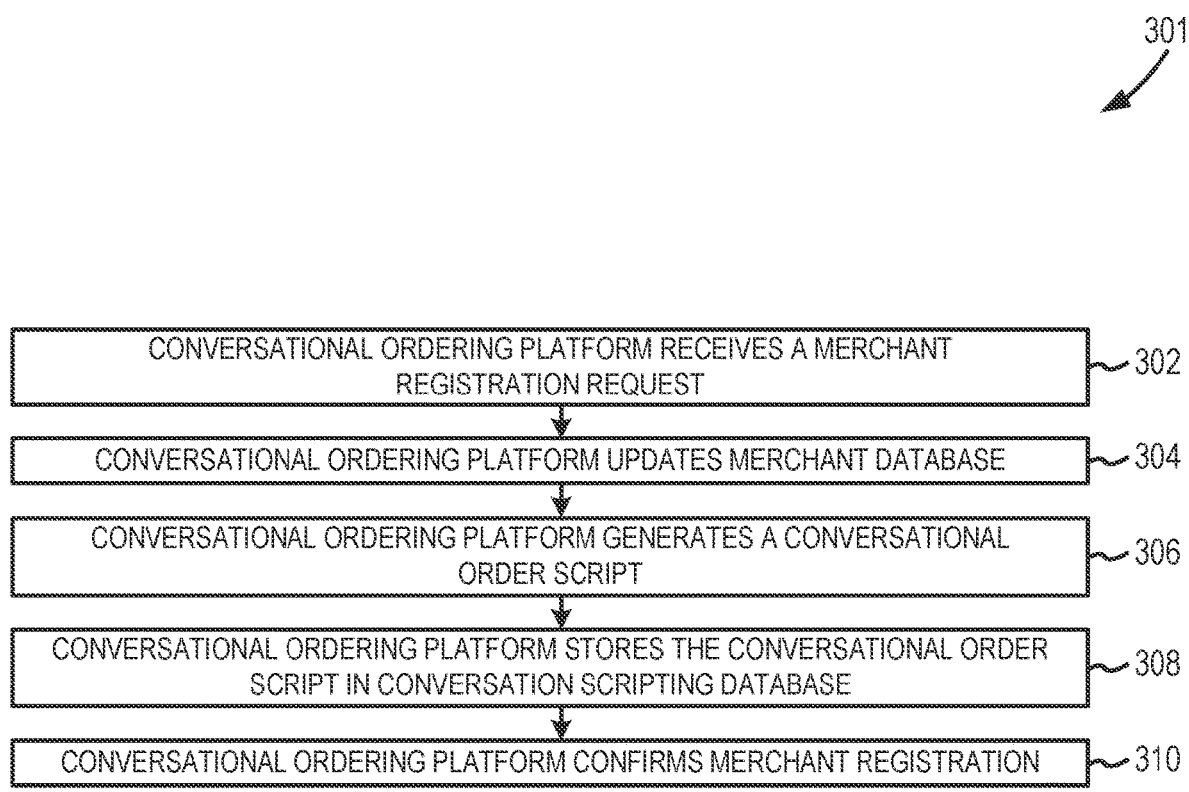
FIG. 3 illustrates a process flow for a method of merchant registration for text-based secure transactions, in accordance with various embodiments.
Figure 4:
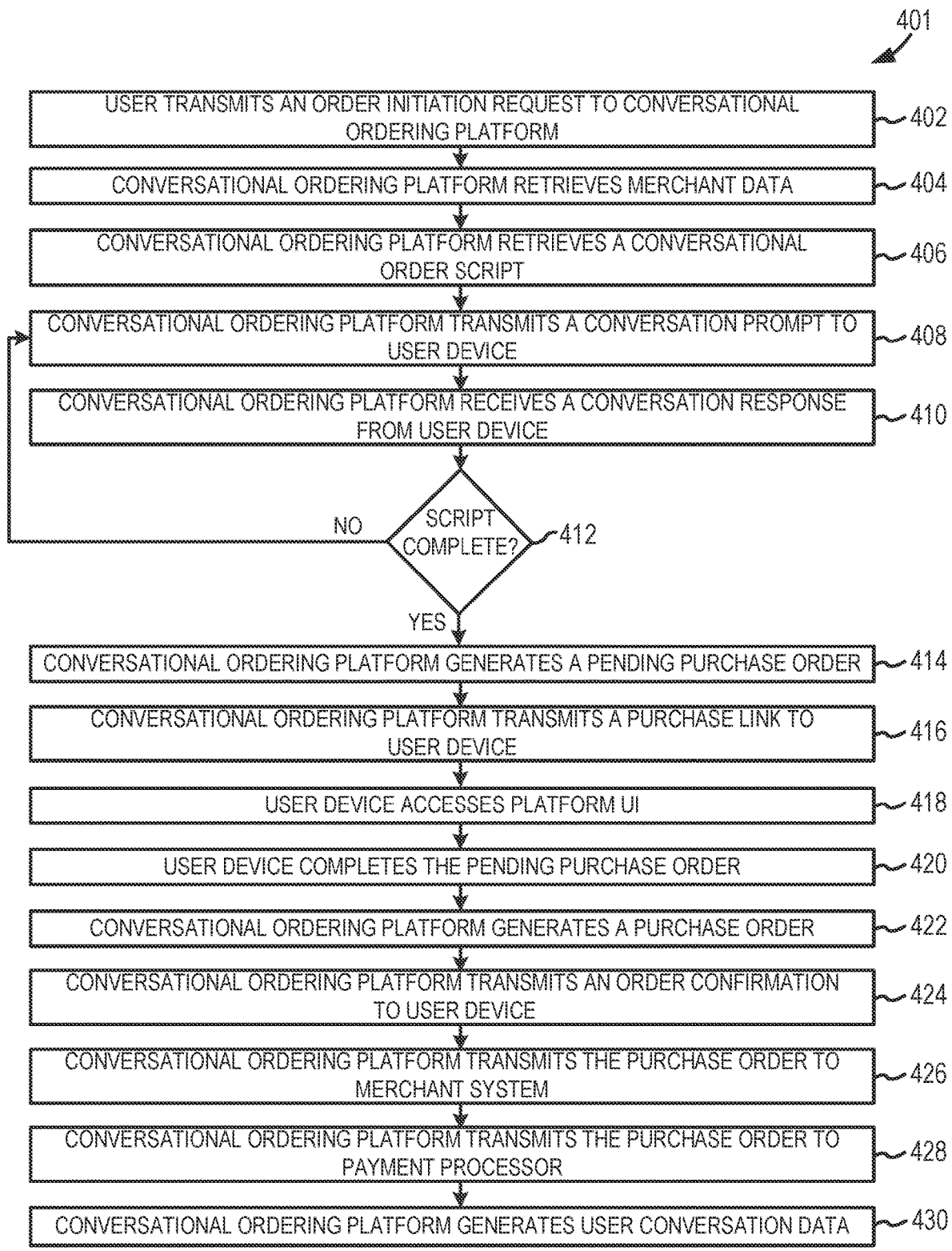
FIG. 4 illustrates a process flow for a method for text-based secure transaction processing, in accordance with various embodiments.

Referring now to FIGS. 3 and 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3 and 4, but also to the various system components as described above with reference to FIGS. 1 and 2.

With specific reference to FIG. 3, and in accordance with various embodiments, a method 301 of merchant registration for text-based secure transactions is disclosed. Merchant system 160 may interact with conversational ordering platform 110 to register one or more products or services to be available for text-based secure transactions. For example, conversational ordering platform 110, via registration system 220, receives a merchant registration request (step 302) from merchant system 160. The merchant registration request may comprise merchant data, order data, payment option data, and the like. The merchant data may comprise merchant identifying data (e.g., merchant name, merchant ID, etc.), merchant contact information (e.g., merchant address, merchant phone number, etc.), merchant preferences (e.g., receive completed orders as a batch process or individually, etc.), and/or the like. The order data may comprise information regarding the products and/or services being made available for text-based secure transactions. For example, the order data may comprise product or service identifying data (e.g., product or service name, product or service ID, etc.), product or service price, product or service promotions (e.g., buy one get one free, free shipping, etc.), and/or the like. The payment option data may comprise information regarding available payment options for the provided order data. For example, merchant system 160 may have relationships with one or more payment processors 170. In that regard, different merchants in the system may allow different payment processing types. For example, a first merchant may offer payment processing options for PAYPAL®, APPLE PAY®, and credit card processing from select card issuers (e.g., VISA®, MASTERCARD®, etc.), a second merchant may offer payment processing options for SQUARE® payments and only select card issuers (e.g., AMERICAN EXPRESS® and VISA®), and/or the like.

In various embodiments, in response to receiving the merchant registration request, conversational ordering platform 110, via registration system 220, updates merchant database 225 (step 304) based on the merchant registration request. For example, in response to merchant system 160 registering with conversational ordering platform 110 for the first time, registration system 220 may create a new merchant record in merchant database 225 and may store the merchant data, the order data, and the payment option data from the merchant registration request in the new merchant record. The data may be grouped by merchant ID and/or any other suitable unique identifier. As a further example, in response to merchant system 160 only registering a new product or service, registration system 220 may update the preexisting merchant record in merchant database 225 to comprise the order data and payment option data.

In various embodiments, conversational ordering platform 110, via registration system 220, generates a conversational order script (step 306). The conversational order script may be based on the order data from the merchant registration request. The conversational order script may relate to one or more products or services made available by the merchant and may comprise one or more conversation prompts. For example, a first conversation prompt may comprise a prompt introduction (e.g., "Are you interested in ordering the product name?", "Are you interested in purchasing from merchant name?", etc.), a prompt response type (e.g., "text Y/N"), a prompt opt-out (e.g., "text STOP to end," "text HELP for help," "standard message and data rates may apply," etc.), and/or the like. As a further example, a second conversation prompt may comprise one or more prompts to follow up on a user's response to the first conversation prompt (e.g., "Great! Product name is in stock," "The product name is $299," "The product name is eligible for a buy one, get one free promotion," "Are you ready to order?", etc.) and a prompt response type (e.g., "Y/N"). In various embodiments, the second conversation prompt may also comprise a product or service selection prompt (e.g., "Merchant name has the following products available: X, Y, and Z," "text X to order product X, Y to order product Y, or Z to order product Z," etc.). As a further example, the final conversation prompt in the conversational order script may comprise data instructing conversation engine 230 to generate and transmit a purchase link to user 101 (e.g., via user device 105). The purchase link may comprise a web URL or the like configured to direct user 101 to platform UI 240 to complete the purchase order, as discussed further herein.

Conversational ordering platform 110, via registration system 220, stores the conversational order script in conversation scripting database 227 (step 308). In various embodiments, registration system 220 may also update the merchant record in merchant database 225 to comprise a unique script ID, tag, or the like corresponding to the stored conversational order script. Registration system 220 may also assign a unique direct order identifier to the merchant data. The unique direct order identifier may comprise one or more of a phone number, email address, chat name, or the like for use by user 101 to initiate a purchase order. In that regard, in response to user 101 texting, emailing, chatting, or the like using the unique direct order identifier, conversational ordering platform 110 may be configured to retrieve merchant data, product data, the conversational order script, or the like corresponding to the unique direct order identifier.

In various embodiments, in response to generating and storing the conversational order script, conversational ordering platform 110, via registration system 220, confirms merchant registration (step 310) with merchant system 160. The confirmation may comprise the unique direct order identifier associated with the registration.

With specific reference to FIG. 4, and in accordance with various embodiments, a method 401 for text-based secure transaction processing is disclosed. User 101, via user device 105, transmits an order initiation request to conversational ordering platform 110 (step 402) to initiate a transaction. User 101 may transmit the order initiation request via a unique direct order identifier (e.g., a unique identifier assigned to a communications channel) comprising a phone number, email address, chat name, or the like. For example, the unique direct order identifier may be given to user 101 as part of a direct advertising campaign or the like. The order initiation request may be transmitted via SMS, MMS, email message, webchat, social media (e.g., message, tweet, post, etc.), API, or any other method of relaying text-based communications.

In response to receiving the order initiation request, conversational ordering platform 110, via conversation engine 230, retrieves merchant data (step 404) from merchant database 225, based on the order initiation request. For example, conversation engine 230 may query merchant database 225 based on the unique direct order identifier used by user 101. Conversation engine 230 may retrieve the merchant record corresponding to the unique direct order identifier, such as, for example, the script ID, the merchant data, the order data, the payment processing options, and the like. Conversational ordering platform 110, via conversation engine 230, retrieves a conversational order script (step 406) from conversation scripting database 227, based on script ID retrieved from merchant database 225. The conversational order script may comprise one or more conversation prompts configured to guide user 101 in initiate and completing the purchase order.

In various embodiments, conversational ordering platform 110, via conversation engine 230, transmits a (first) conversation prompt to user device 105 (step 408). The (first) conversation prompt may be text-based and may be transmitted according to the same channel used by user device 105 to transmit the order initiation request (e.g., SMS, MMS, email, webchat, API, etc.). For example, a (first) conversation prompt may comprise a prompt introduction (e.g., "Are you interested in ordering the product name?", "Are you interested in purchasing from merchant name?", etc.), a prompt response type (e.g., "text Y/N"), a prompt opt-out (e.g., "text STOP to end," "text HELP for help," "standard message and data rates may apply," etc.), and/or the like. The (first) conversation prompt may also comprise embedded multimedia such as images, videos, and the like corresponding to the product or service associated with the order initiation request.

Conversational ordering platform 110, via conversation engine 230, receives a (first) conversation response from user device 105 (step 410). The (first) conversation response may be text-based and may be transmitted by user device 105 based on the (first) conversation prompt (e.g., "Y," "HELP," etc.). In various embodiments, conversational ordering platform 110, via conversation engine 230, may be configured to recognize alternative responses and will attempt to match the alternative response with an expected response based on the conversation prompt. For example, conversational ordering platform 110, via conversation engine 230, may be configured to recognize full alternatives (e.g., "YES"), language-based alternatives (e.g., "si," "oui," etc.), and/or the like. In response to being unable to recognize the response, based on the conversation prompt presented, conversational ordering platform 110, via conversation engine 230, may retransmit the (first) conversation prompt.

In response to receiving the (first) conversation response, conversation engine 230 may determine whether the conversational order script is complete or whether to transmit a second conversation prompt. In response to the conversational order script not being complete (step 412), conversational ordering platform 110, via conversation engine 230, transmits a second conversation prompt to user device 105 based on the first conversation response. The second conversation prompt may comprise one or more prompts to follow up on the (first) conversation respond (e.g., "Great! Product name is in stock," "The product name is $299," "The product name is eligible for a buy one, get one free promotion," "Are you ready to order?", etc.) and a prompt response type (e.g., "Y/N"). In various embodiments, the second conversation prompt may also comprise a product or service selection prompt (e.g., "Merchant name has the following products available: X, Y, and Z," "text X to order product X, Y to order product Y, or Z to order product Z," etc.).

Conversational ordering platform 110, via conversation engine 230, receives a second conversation response from user device 105. The second conversation response may be text-based and may be transmitted by user device 105 based on the second conversation prompt (e.g., "Y," "Product X," etc.). In various embodiments, in response to receiving the second conversation response, conversation engine 230 may determine whether the conversational order script is complete or whether to continue to transmit additional conversation prompts, based on the conversational order script.

In response to the conversational order script being complete (step 412), conversational ordering platform 110, via conversation engine 230, generates a pending purchase order (step 414). The pending purchase order may comprise the merchant data, the order data, the payment processing options, and a unique order ID (e.g., generated by conversational ordering platform 110). Conversation engine 230 may transmit the pending purchase order to ordering system 250 for display on platform UI 240, as discussed further herein. Conversational ordering platform 110, via conversation engine 230, transmits a purchase link to user device 105 (step 416). The purchase link may comprise a web URL, tiny URL, or the like configured to direct user 101 to platform UI 240 to complete the purchase order, as discussed further herein.

In response to receiving the purchase link, user device 105 accesses platform UI 240 (step 418) via the purchase link. For example, in response to user 101 interacting with the purchase link (e.g., clicking on the link), user device 105 may open a native web browser and direct the web browser to access the URL associated with the purchase link. In response to user 101 accessing the purchase link, platform UI 240 may display the pending purchase order. For example, platform UI 240 may display merchant data (e.g., merchant name, merchant address, etc.), order data (e.g., the product or service to be purchased, the product or service price, etc.), an order total, an order shipping cost, order shipping options, available payment options (e.g., PAYPAL®, APPLE PAY®, GOOGLE PAY®, credit card, etc.), and the like.

In various embodiments, user device 105 completes the pending purchase (step 420) order via platform UI 240, such as, for example, by selecting and inputting payment information, selecting a shipping option, inputting a shipping address, confirming the purchase of the product or service, and/or the like.

In response to user 101 completing the pending purchase order, conversational ordering platform 110, via ordering system 250, generates a purchase order (step 422). The purchase order may comprise a unique order ID, the transaction total, merchant data (e.g., merchant ID, merchant name, etc.), user data (e.g., name, shipping address, etc.), payment option selection (e.g., PAYPAL®, credit card, etc.), and the like. Ordering system 250 may store the purchase order in order database 255.

In various embodiments, conversational ordering platform 110 transmits an order confirmation to user device 105 (step 424). The order confirmation may comprise the order ID, and may comprise data corresponding to the purchase order, such as, for example shipping information, a shipping tracking number, or the like. In various embodiments, the order confirmation may also comprise customer support contact information corresponding to merchant system 160, such as, for example, a phone number, email address, or the like.

Conversational ordering platform 110, via ordering system 250, transmits the purchase order to merchant system 160 (step 426). Ordering system 250 may transmit various purchase orders as a batch process, individually, or in any other suitable combination. In various embodiments, ordering system 250 may transmit the purchase order based on merchant preference data stored in merchant database 225.

Conversational ordering platform 110, via ordering system 250, transmits the purchase order to payment processor 170 (step 428). In various embodiments, the purchase order may also comprise user billing information, such as, for example, transaction account data (e.g., transaction account number, security code, expiration date, etc.), billing address, or the like. In various embodiments, platform UI 240 may redirect user device 105 to a user interface associated with payment processor 170. For example, payment processor 170 may comprise a login system prompting user 101 to register or login to complete the payment. User 101 may input transaction account data to complete payment with payment processor 170. In response to user 101 completing payment, payment processor 170 may transmit a payment confirmation to merchant system 160. The payment confirmation may comprise the order ID and any other suitable information corresponding to the completed payment.

In various embodiments, conversational ordering platform 110 generates user conversation data (step 430). The user conversation data may comprise a record of the text-based conversation between user 101 and conversation engine 230. In various embodiments, the user conversation data may also comprise data input and/or selected by user 101 during the order confirmation process in platform UI 240. Conversational ordering platform 110 may generate the user conversation data at any point during method 401. For example, conversational ordering platform 110 may capture the user conversation data in response to receiving any communication from user 101 (e.g., a prompt response, an input into platform UI 240), in response to user 101 completing the purchase order, and/or the like.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with," or similar phrases may include an identical match, a partial match, meeting certain criteria, matching a subset of data, a correlation, satisfying certain criteria, a correspondence, an association, an algorithmic relationship, and/or the like.

The terms "transaction account," "financial transaction instrument," "transaction instrument", and/or the plural form of these terms may be used interchangeably throughout to refer to a financial instrument. Phrases and terms similar to "transaction account" may include any account that may be used to facilitate a financial transaction. For example, the transaction account may include any device, code (e.g., one or more of an authorization/access code, personal identification number ("PIN"), internet code, other identification code, and/or the like), number, letter, symbol, digital certificate or token, smart chip, digital signal, analog signal, biometric, or other identifier/indicia suitably configured to allow the consumer to facilitate a financial transaction. The account number may optionally be located on or associated with a rewards account, charge account, credit account, debit account, prepaid account, embossed card, smart card, magnetic stripe card, bar code card, transponder, radio frequency card, or an associated account.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random-access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator (URL), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, a social media message, multimedia messaging services (MMS), and/or other type of communication technology. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams (e.g., as provided in FIGS. 1 and 2) and flowchart illustrations (e.g., as provided in FIGS. 3 and 4) support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user applications, webpages, websites, web forms, prompts, etc. Practitioners will appreciate that the illustrated steps described herein may comprise any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus (ESB) application is another example of middleware.

The systems, computers, articles of manufacture, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network, such as, for example any device or software discussed herein. The web client may include internet browsing software installed within a computing unit or a system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out (I/O) bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain systems, individuals, levels of employees, companies, or other entities to access data sets, or to permit access to specific data sets. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation (NAT) and/or network address port translation (NAPT). The firewall may accommodate various tunneling protocols to facilitate secure communications, such as those used in virtual private networking. The firewall may implement a demilitarized zone (DMZ) to facilitate communications with a public network such as the internet. The firewall may be integrated as software within an internet server, any other application server components or may reside within another computing device or may take the form of a standalone hardware component.

The system and method may be described herein in terms of functional block components, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine (PM2); a resource and performance monitoring tool, such as, for example, Node Application Metrics (appmetrics); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the interne, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, electrical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a processor, an order identifier from a user device;
   retrieving, by the processor, product data and an order script that is associated with the order identifier;
   transmitting, by the processor, a first prompt from the order script to the user device to determine interest in placing an order for a product associated with the product data;
   receiving, by the processor, a first response from the user device, wherein the first response is based on the first prompt and provides confirmation of the interest in placing the order for the product;
   creating, by the processor, a custom purchase order comprising the order identifier; and
   transmitting, by the processor, a purchase link to the user device, wherein the purchase link comprises a customized web URL that displays the custom purchase order and provides an online platform, wherein the online platform orders the product based on the custom purchase order;
   redirecting, by the processor, the user device to the payment processor; and
   transmitting, by the processor, the custom purchase order to the payment processor, in response to receiving the custom purchase order, the payment processor is configured to process a payment from the user device, wherein the payment is associated with the custom purchase order.

2. The method of claim 1, further comprising retrieving, by the processor, a merchant record from a merchant system based on the product data.

3. The method of claim 1, further comprising receiving, by the processor, a user input in response to the user device accessing the purchase link, wherein the user input comprises at least one of a purchase confirmation, shipping information, or billing information.

4. The method of claim 3, further comprising generating, by the processor, the custom purchase order based on user input.

5. The method of claim 4, further comprising transmitting, by the processor, the custom purchase order to a merchant system.

6. The method of claim 1, further comprising:
   storing, by the processor, conversational script including the first prompt and the first response, in a database;
   associating, by the processor, a script identifier with the conversational script; and
   associating, by the processor, the script identifier with a merchant record.

7. The method of claim 1, wherein the order identifier comprises at least one of a phone number, an email address, or a chat name.

8. The method of claim 1, wherein the first prompt and the first response are transmitted via at least one of simple messaging service (SMS), multimedia messaging service (MMS), email, API, or webchat.

9. The method of claim 1, further comprising receiving, by the processor, a merchant registration request from a merchant system, wherein the merchant registration request includes at least one of a merchant record, products or services for order by the user device.

10. The method of claim 1, further comprising determining, by the processor, that the order script is complete.

11. The method of claim 1, further comprising transmitting, by the processor, a fourth prompt, wherein the fourth prompt includes a function for obtaining help.

12. The method of claim 1, wherein the processor is part of an ordering platform.

13. The method of claim 1, wherein the online platform receives input from the user device.

14. The method of claim 1, wherein the order identifier is associated with a merchant record.

15. The method of claim 1, wherein the merchant record comprises merchant data, order data, payment option data and script ID.

16. The method of claim 1, wherein the order identifier is created by a merchant system.

17. The method of claim 1, wherein the user device receives the order identifier from the merchant system.

18. The method of claim 1, wherein the order identifier is associated with product data provided by the merchant system.

19. The method of claim 1, further comprising:
- transmitting, by the processor, a second prompt from the order script to the user device to provide the merchant record, the product data and the inventory data about the product; and
- receiving, by the processor, a second response from the user device, wherein the second response is based on the second prompt and provides confirmation of the product data and the product.

20. The method of claim 1, further comprising determining, by the processor, a merchant record, inventory data, the product data and one of a plurality of order scripts based on the order identifier.

* * * * *